United States Patent
Erra Serrabasa et al.

(10) Patent No.: US 12,096,786 B2
(45) Date of Patent: Sep. 24, 2024

(54) METHOD FOR OBTAINING A LIQUID FOOD PRODUCT AND LIQUID FOOD PRODUCT OBTAINED THEREOF

(71) Applicant: Liquats Vegetals, SA, Viladrau (ES)

(72) Inventors: Josep M. Erra Serrabasa, Sant Feliu de Guixols (ES); Montse Nebra Soler, Barcelona (ES); Laura Castineira Busquets, Viladrau (ES); Jordi Casaramona Codinach, Avinyo (ES); Neus Bernat Perez, Barcelona (ES); Sergi Abad Sanchez, Caldes de Montbui (ES); Alba Gutierrez Montero, Bigues I Riells (ES)

(73) Assignee: LIQUATS VEGETALS, SA, Viladrau (ES)

(*) Notice: Subject to any disclaimer, the term of this patent is extended or adjusted under 35 U.S.C. 154(b) by 0 days.

(21) Appl. No.: 18/258,010

(22) PCT Filed: Aug. 31, 2022

(86) PCT No.: PCT/EP2022/074154
§ 371 (c)(1),
(2) Date: Jun. 16, 2023

(87) PCT Pub. No.: WO2023/099052
PCT Pub. Date: Jun. 8, 2023

(65) Prior Publication Data
US 2024/0041075 A1    Feb. 8, 2024

(30) Foreign Application Priority Data
Dec. 2, 2021 (WO) ............... PCT/EP2021/083977

(51) Int. Cl.
| | |
|---|---|
| A23L 7/104 | (2016.01) |
| A23C 11/10 | (2021.01) |
| A23F 3/40 | (2006.01) |
| A23F 5/46 | (2006.01) |
| A23J 1/12 | (2006.01) |
| A23L 2/84 | (2006.01) |

(52) U.S. Cl.
CPC ............ *A23L 7/107* (2016.08); *A23C 11/10* (2013.01); *A23F 3/40* (2013.01); *A23F 5/46* (2013.01); *A23J 1/125* (2013.01); *A23L 2/84* (2013.01)

(58) Field of Classification Search
None
See application file for complete search history.

(56) References Cited

U.S. PATENT DOCUMENTS

| | | | |
|---|---|---|---|
| 8,337,880 B2 | 12/2012 | Chen | |
| 2011/0236545 A1* | 9/2011 | Brown | A23C 11/103 426/656 |

(Continued)

FOREIGN PATENT DOCUMENTS

| | | |
|---|---|---|
| CN | 112106841 A | 12/2020 |
| CN | 112401007 A | 2/2021 |

(Continued)

OTHER PUBLICATIONS

Olsen, H.S. (1995). Enzymes in Food Processing. In Biotechnology (eds H.-.-J. Rehm and G. Reed). https://doi.org/10.1002/9783527620920.ch18 (Year: 1995).*

(Continued)

*Primary Examiner* — Donald R Spamer
*Assistant Examiner* — Lela S. Davis
(74) *Attorney, Agent, or Firm* — Allen, Dyer et al.

(57) ABSTRACT

A process for preparing a liquid food product comprising obtaining an oat flour by milling peeled oat grain; mixing the oat flour with water to obtain mixture B; adding at least one glycosidase and heating to a maximum of 80° C., obtaining mixture C comprising a liquid portion containing particles in suspension and a precipitating portion; lowering the temperature of mixture C to a maximum of 30° C. and adding a combination of at least a protease, a deamidase and a (Continued)

transglutaminase to obtain mixture D; incubating mixture D; and separation of the liquid portion and the precipitating portion of mixture D; or separation of the liquid portion and the precipitating portion of mixture C; lowering the temperature of the liquid portion to a maximum of 2° C. and adding at least a protease, a deamidase and a transglutaminase to obtain liquid portion D; and incubating liquid portion D.

13 Claims, 1 Drawing Sheet

(56) References Cited

U.S. PATENT DOCUMENTS

2015/0351432 A1* 12/2015 Triantafyllou ......... A23C 11/10
                                                                            426/28
2020/0390136 A1    12/2020  Myllarinen

FOREIGN PATENT DOCUMENTS

| EP | 2953482 A1 | 12/2015 |
| WO | WO2016142278 A1 | 9/2016 |
| WO | WO2020025856 | 2/2020 |

OTHER PUBLICATIONS

Jiang et. al., Journal of Cereal Science 64 (2015) ,Oat protein solubility and emulsion properties improved by enzymatic deamidation (Year: 2015).*

European Patent Office; International Search Report and Written Opinion for PCT/EP2022/074154; Nov. 28, 2022; entire document.

Saha et al.; Debittering of protein hydrolyzates; Biotechnolgy Advances; vol. 1, pp. 355-370; 2001.

* cited by examiner

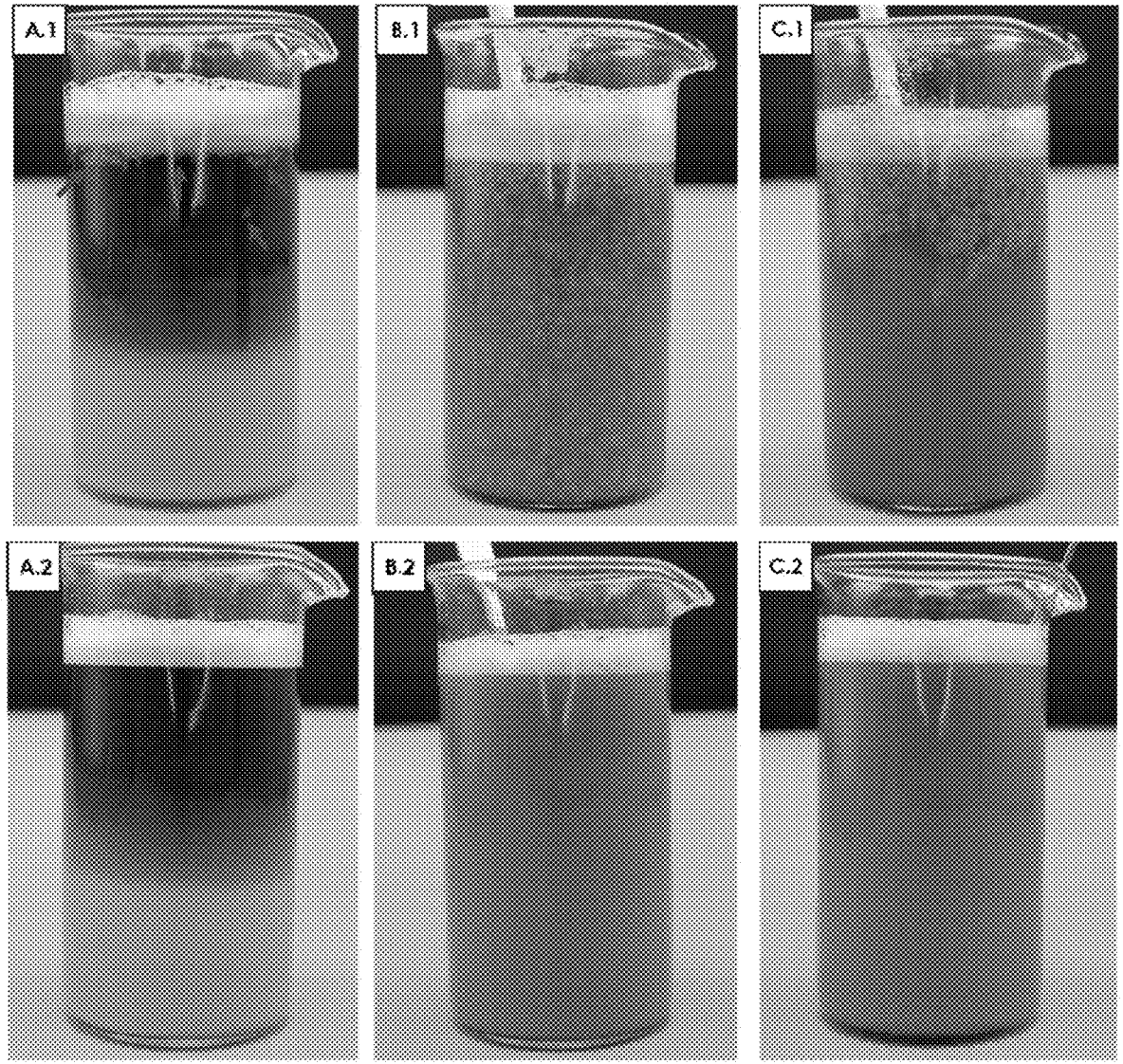

METHOD FOR OBTAINING A LIQUID FOOD PRODUCT AND LIQUID FOOD PRODUCT OBTAINED THEREOF

TECHNICAL FIELD

The present disclosure relates to a process for obtaining a liquid food product. It further relates to the product obtained from such a process and the use of said product together with acidic beverages.

BACKGROUND ART

In recent years, the consumption of vegetable drinks, also known as non-dairy drinks, to prepare mixtures with any kind of coffee or tea has increased. Said beverages pursue the aim to obtain coffee drinks similar to those obtained with cow milk (Kanter Worldpanel: Oat Study, 2019). However, the proteins contained in said vegetable drinks are not as resistant to the acidity of coffee and they tend to coagulate as a result of this acidity along with the usual process of pre-heating the drinks. This results in a loss of the homogeneity of the drink and a final visual appearance that causes consumer rejection.

In fact, at a company leading in vegetable drinks, Liquats Vegetals S.A., 34% of product complaints from consumers received during 2020 were due to problems with the stability of vegetable drinks suitable for coffee and, of these, 52% were oat-based drinks. On the other hand, in the specific case of oats, Liquats Vegetals S.A. has observed the appearance of bitterness in oat drinks that increase with storage time and are linked to the final state of the proteins in the UHT product.

On the one hand, most of the non-dairy beverages' producers solve the plant protein instability by adding additives such as acidity regulators or stabilizers. However, this can also cause consumer rejection, since these kind of additives are difficult to understand, might be considered controversial in terms of healthiness and, all in all, make the final product "less natural".

On the other hand, the use of proteolytic enzymes to improve proteins solubility, heat stability and resistance to precipitation in acidic environments can be a good alternative to additives but, so far, protein hydrolysates generated have a bitter taste, which is rejected by consumers (Saha B. C, Hayashi K., 2001).

There are several vegetable drinks based on oat in the market and several methods known in the art to produce vegetable drinks, specifically oat-based drinks.

For instance, patent application EP2953482 describes a liquid oat base and a method of manufacture, wherein the protein in the oat is solubilized by means of protein-deamidase without the use of protease.

Patent application US8337880 discloses a method to produce an oligo-saccharide enhanced oat-based drink useful in treating hyperlipidemia and hyperglycemia comprising the use of α-amylase and β-amylase together with transglucosidase.

Patent application WO 2020/025856 discloses a method of preparing a high-protein liquid oat base for use in the manufacture of food for human consumption comprising ultrasonication and enzyme treatment of oat raw materials. This application also relates to a high-protein, liquid oat bases, to products prepared therefrom, and to the use of ultrasonication for improving solubility of oat proteins.

Besides the oat-protein instability, most of the oat-based drinks contain gluten and the little supply market in gluten-free oat bases reaches 15% or more of increase in price than standard products, due to the use of the so-called "pure oats" (oats that are grown in a manner that cross-contamination with grains that contain gluten is assured). Bearing in mind that both the celiac disease prevalence in Europe and over the world is 1% and around 75% is estimated to be undiagnosed (Muñoz Tello, P (2018): "Prevalencia mundial de la enfermedad celiaca"), there is a need to offer gluten-free oat products with more competitive prices. Additionally, there is a concern in gluten consumption and so the consumer enquiries in Liquats Vegetals S.A. have reflected: 43% of the total enquiries received in 2020 were related to gluten.

Therefore, there remains in the art a need for an effective means for producing non-dairy drinks overcoming the aforementioned problems, that is, stabilizing the proteins in said drinks, specifically oat-based drinks, avoiding coagulation and precipitation of proteins once the consumer submits the drink to stressful events such as heating it up and adding an acid media such as coffee or tea, together with preserving and the organoleptic properties or minimizing off-notes such as bitterness. Moreover, in the case of oat beverages, there remains in the art a need for an effective and cost-efficient pre-treatment of oats to eliminate the cross-contamination of gluten and, thus, obtain gluten-free products affordable for all kind of consumers.

SUMMARY OF THE INVENTION

In order to address one or more of the foregoing problems, one aspect of the present invention provides a process for preparing a liquid food product comprising: a) a first step comprising obtaining an oat flour by milling peeled oat grain; b) a second step comprising mixing the oat flour with water to obtain mixture B; c) a third step comprising adding at least one glycosidase to mixture B, and heating mixture B at a rate of 1 to 10° C. per minute to a maximum of 80° C., obtaining mixture C comprising a liquid food portion containing particles in suspension and a precipitation portion; and d) a step comprising lowering the temperature of mixture C or the liquid portion of mixture C, and adding to mixture C or the liquid portion of mixture C a combination of at least a protease, a deamidase and a transglutaminase; wherein step d) is implemented by d1) a fourth step comprising lowering the temperature of mixture C to a maximum of 30° C. and adding to mixture C a combination of at least a protease, a deamidase and a transglutaminase to obtain mixture D; the process further comprising e1) a fifth step comprising incubating mixture D; and f1) a sixth step comprising the separation of the liquid portion and the precipitating portion of mixture D to obtain the liquid food product; or wherein step d) is implemented by e2) a fifth step comprising lowering the temperature of the liquid portion of mixture C to a maximum of 2° C. and adding to the liquid portion of mixture C a combination of at least a protease, a deamidase and a transglutaminase to obtain liquid portion D; the process further comprising d2) a fourth step preceding step e2) comprising the separation of the liquid portion and the precipitating portion of mixture C; and f2) a sixth step comprising incubating the liquid portion D to obtain the liquid food product.

Another aspect of the invention relates to a liquid food product obtained by the above-mentioned process and to a tea- of coffee-based beverage comprising the liquid food product A further aspect of the invention relates to a process of preparing a liquid food product suitable for human consumers wherein the liquid food product is the final product or a starting of the process.

BRIEF DESCRIPTION OF THE DRAWINGS

FIG. 1 comprises three images of a glass containing liquid food product according to the present invention mixed with coffee (images A.2, B.2 and C.2) and three images of a glass containing an oat liquid product control (i.e. not according to the invention) mixed with coffee (images A.1, B.1 and C.1). Letters in the FIGURES stand for the following: A) Liquid food product heated until boiling point with hot coffee drink added in equal parts without mixing; B) liquid food product heated until boiling point with hot coffee drink added in equal parts after 10 seconds of mixing with a spoon; and C) Liquid food product heated until boiling point with hot coffee drink added in equal parts after 10 seconds of mixing with a spoon and being left stored for 3 minutes.

DETAILED DESCRIPTION OF THE INVENTION

The process for preparing a liquid food product is as defined in the present disclosure.

The process for preparing a liquid food product according to the present invention comprises: a) a first step comprising obtaining an oat flour by milling peeled oat grain; b) a second step comprising mixing the oat flour with water to obtain mixture B; c) a third step comprising adding at least one glycosidase to mixture B, and heating mixture B at a rate of 1 to 10° C. per minute to a maximum of 80° C., obtaining a mixture C comprising a liquid portion containing particles in suspension and a precipitating portion; and d) a step comprising lowering the temperature of mixture C or the liquid portion of mixture C, and adding to mixture C or the liquid portion of mixture C a combination of at least a protease, a deamidase and a transglutaminase; wherein step d) is implemented by d1) a fourth step comprising lowering the temperature of mixture C to a maximum of 30° C. and adding to mixture C a combination of at least a protease, a deamidase and a transglutaminase to obtain mixture D; the process further comprising e1) a fifth step comprising incubating mixture D; and f1) a sixth step comprising the separation of the liquid portion and the precipitating portion of mixture D to obtain the liquid food product; or wherein step d) is implemented by e2) a fifth step comprising lowering the temperature of the liquid portion of mixture C to a maximum of 2° C. and adding to the liquid portion of mixture C a combination of at least a protease, a deamidase and a transglutaminase to obtain liquid portion D; the process further comprising d2) a fourth step preceding step e2) comprising the separation of the liquid portion and the precipitating portion of mixture C; and f2) a sixth step following step e2) comprising incubating the liquid portion D to obtain the liquid food product.

Therefore, two main alternatives are envisaged for the process according to the present invention: a first one that involves treating mixture C at a maximum of 30° C. with a combination of enzymes comprising a combination of at least a protease, a deamidase and a transglutaminase and separating the liquid portion from the precipitating portion after protein enzymatic treatment; and a second that involves first separating the liquid portion from the precipitating portion of mixture C and a subsequent treatment at a lower temperature (at 2° C. or more) of the liquid portion with an enzyme combination comprising at least a protease, a deamidase and a transglutaminase.

Therefore, the process according to the present invention is defined as two alternatives. Both alternatives have steps a), b), c) and d) in common. However, step d) comprising lowering the temperature and adding a combination of enzymes comprising at least a protease, a deamidase and a transglutaminase may be implemented differently. In a first alternative, steps d1) e1) and f1), lowering the temperature and addition of enzymes is performed on mixture C as whole, that is, in mixture C comprising a liquid and a precipitating portion. In the second alternative, steps d2), e2) and f2), lowering the temperature and addition of enzymes is performed after separation of the liquid and precipitating portion of mixture C. Both alternatives yield the same liquid food product.

Moreover, the process according to the present invention may further comprise a seventh step g1) of submitting the liquid portion to a temperature drop of at least 1° C. per minute to reach a temperature of 2° C. or more, preferably 4° C., preferably in the process according to the first alternative (steps d1), e1) and f1)) and/or an eighth step h) of microbiological stabilization of the obtained liquid portion. Therefore, in the first alternative of the process according to the present invention, the liquid portion of mixture D is obtained, then a temperature drop is applied and a further microbiological stabilization step is performed. In the second alternative, since the protein-enzymatic treatment might be performed at low temperatures, such as from 2 to 8° C., a temperature drop may not apply.

By including step h) in the claimed process, the enzymatic activity is minimized, preferably stopped, and moreover, the liquid food product is microbiologically safe for human consumption.

According to the process disclosed in the present invention, the liquid portion is separated from the precipitating portion in steps f1) or d2) preferably by centrifugation or decantation.

The temperature drop refers to a process of fast temperature reduction (i.e. in 120 minutes or less, at a rate of at least 1° C. per minute), from the starting temperature (i.e. 30 to 60° C.) to a low temperature (i.e. 2 to 8° C.) so as to prevent harmful microorganism growth in a food product, specifically in a liquid food product.

Lowering the temperature in step d1) to a maximum of 30° C. means that the temperature of mixture C is lowered up to 30° C. or more.

Lowering the temperature in step e2) to a maximum of 2° C. means that the temperature of the liquid portion of mixture C is lowered up to 2° C. or more.

The skilled person would understand that microbiological stabilization, as in step h) of the claimed process, refers to a method to provide absence of both pathogenic and non-desirable microorganisms to the liquid food product during the preparation process and throughout the period of storage and use. Common microbiological stabilization methods include, but are not limited to, pasteurization, ultra-high temperature processing (UHT), sonication or high pressure processing.

The skilled person would understand that glycosidases are enzymes that catalyze the hydrolytic cleavage of a glycosidic bonds typically in polysaccharides. They belong to the enzyme class 3.2.

The process according to the present invention may involve, in step b), mixing the oat flour in water with one glycosidase.

Preferably, the glycosidase in step b) is α-amylase (EC 3.2.1.1). Optionally, α-amylase can be combined with β-glucanase (EC 3.2.1.6). These two glycosidases are added to control and standardize the viscosity generated or possibly generated by starch and β-glucans originating from oat processing (i.e. milling). α-amylase converts by means of hydrolysis of the α-bonds in high molecular weight polysaccharides, such as starch, into soluble products, such as sugars, dextrines and oligosaccharides; β-glucanase hydrolyzes the chains of high-molecular weight β-glucans, preventing their aggregation and obturation while processing the oat flour. Preferred concentration of the glycosidase in step b) is preferably between 0.01% and 0.08% by weight with respect to the volume of the first mixture, i.e., the volume of the mixture of oat flour and water. Preferably, the concentrations of the glycosidases are between 0.03-0.07% by weight of α-amylase and 0.015-0.04% by weight of β-glucanase with respect to the volume of the first mixture.

As described herein, step c) involves obtaining mixture C comprising a liquid portion containing particles in suspension and a precipitating portion. That is, the conditions to which mixture B is submitted in step c) yield a liquid portion that contains a soluble part and a non-soluble part that is in suspension, and a precipitating portion that is non-soluble and is deposited (i.e. precipitated) onto the bottom of the recipient/reactor/tank where mixture B is treated with at least one glycosidase and gradually heated as described herein. Therefore, the skilled person will understand that the liquid portion is a suspension and the precipitating portion is a non-soluble solid portion that is not in suspension, and can be separated by means available in the art (e.g. by decantation) from the liquid portion.

Moreover, step c) preferably involves the addition of at least one glycosidase to mixture B together with simultaneous heating of said mixture. The addition of the enzyme (or enzymes) concomitant with the heating of mixture B has the advantage of decreasing the processing time, since the incubation of mixture B with the enzyme (or enzymes) in step c) takes place while the temperature is raised (to a maximum of 80° C.).

The skilled person would understand that proteases are enzymes that catalyze proteolysis by cleaving the peptide bonds within proteins. They belong to the enzyme class 3.4.

The protease described in the process according to the present invention may preferably be an acid carboxi-peptidase (EC 3.4.16.6). The protease contributes to the gluten removal by hydrolyzing gliadins, one of the main protein components of the gluten, into smaller peptides that do not trigger an immune response as the gluten does. The remaining intact gluten represent less than 20 ppm in the liquid food product obtained by the process disclosed in the present invention.

The skilled person would understand that transglutaminases are enzymes that primarily catalyze the formation of an isopeptide bond between γ-carboxamide groups of glutamine residue side chains and primary amines or ε-amino groups of lysine residue side chains. They belong to the enzyme class 2.3.2. The EC number of the transglutaminase according to the present invention is preferably 2.3.2.13.

The skilled person would understand that deamidases are enzymes that cleave carbon-nitrogen bonds other than peptide bonds. The deamidase described in the process according to the present invention may preferably be protein-glutaminase (EC 3.5.1.44).

Both deamidase and transglutaminase contribute to improving the solubility and emulsification of the proteins in the mixture.

Optionally, in the process according to the present invention, mixture C is transferred into a new container (or tank) before lowering the temperature as defined in step d1) and/or in step e2). Transfer to different containers or tanks of the different mixtures obtained in the process according to the present invention is also envisaged.

In the process according to the present invention, the combination of protease, deamidase and transglutaminase are preferably added simultaneously to mixture C in step d1) or to the liquid portion of mixture C in step e2). The inventors of this application have surprisingly found that including the combination of at least these three enzymes in the process to obtain an oat-based liquid food product yields a gluten-free liquid food product that is stable per se, has good organoleptic properties and remains stable (i.e. does not form aggregates) when combined either with aggressive heat treatments (i.e. UHT), acidic hot beverages such as tea or coffee or the combination of both.

The process according to the present invention may further comprise adding a glycosidase in step d1) or e2). Preferably, the glycosidase is an amyloglycosidase, an enzyme that catalyzes the hydrolysis of terminal 1,4-linked glucose residues successively from the non-reducing ends of maltooligo- and polysaccharides. EC number for amyloglycosidase is 3.2.1.3. Preferably, the amyloglycosidase concentration (weight/volume) is in a range between 0.01 and 0.05% by weight with respect to the total volume of the liquid portion in the second mixture.

The process according to the present invention involves the milling of oat. Said milling of oat may be performed by dry milling of oat grain. Alternatively, wet milling of oat grain is also envisaged, by mixing oat grain in water and milling said wet oat grain. Moreover, milling of oat according to the present invention may comprise a combination of dry milling and wet milling. Milling is performed preferably in a series of colloidal mills, wherein the soluble components and those components that might be suspended in solution of the raw material (oat grain) are extracted.

The oat grain according to the present invention preferably comprises between 1 and 25 gluten grains per 100 g of oat. Gluten is usually present in oat grains as a result of cross contamination with gluten-containing cereals, including wheat, barley and rye.

The skilled person will understand that the term oat grains as referred to in the present invention is equivalent to the term oat groats or oat kernels, e.g., the husk of the oat grains in the present invention has been removed.

The oat grains in the present invention may be stabilized, i.e., with their lipase/lipoxygenase activity being removed by means of a pre-treatment. Alternatively, oat grains in the present invention are not submitted to a pre-treatment to remove their lipase/lipoxygenase activity.

Moreover, the oat grain according to the present invention comprises oat protein in an amount between 8 to 20% by weight with respect to the total amount of oat grain, preferably from 8 to 18%, more preferably from 8 to 14%.

The concentration of oat flour in water according to the present invention may preferably be between 15 and 60% by weight with respect to water, more preferably between 20-45%.

The oat flour obtained after oat grain milling is preferably milled to a mean particle size (D50) lower than 3 mm, more preferably lower than 1 mm, even more preferably to a mean particle size lower than 0.5 mm.

The process according to the present invention preferably comprises gradually heating mixture B in step c) to a temperature between 55 and 80° C. Preferably, mixture B in step c) is heated to a temperature between 70 and 80° C., more preferably between 75 and 80° C.

After step c), the organoleptic properties (texture, flavor) may be standardized.

The process according to the present invention comprises preferably an incubation time in steps e1) or f2) between 60 minutes and 48 hours, more preferably between 60 minutes and 180 minutes, even preferably between 80 and 160 minutes.

Incubation should be understood as a time in which a reaction takes place, e.g., an enzymatic treatment. The temperature conditions at which incubation take place may not change and may preferably be the same as when the enzymes have been added to the mixture that is being incubated, that is, if the combination of at least a protease, a deamidase and a transglutaminase has been added to mixture C at e.g. 40° C., incubation is performed at the same 40° C.

The process according to the present invention preferably comprises lowering the temperature in step d1) to a range between 2 and 60° C., preferably between 4 and 60° C., more preferably between 30 and 60° C., more preferably to a temperature range between 45 and 55° C., more preferably between 50 and 55° C., even more preferably between 48 and 55° C. Alternatively, the process according to the present invention comprises lowering the temperature in step e2) to a range between 2 to 30° C., more preferably to a temperature range between 2 to 8° C.

In a preferred embodiment, the incubation time in step e1) is between 60 and 160 minutes, and the temperature in step d1) is lowered to a range between 45 and 55° C.

In another embodiment, the incubation in step f2) might be between 10 and 48 hours, and the temperature in step e2) is lowered to a range between 2 and 8° C. Conditions of time and temperature of incubation may vary depending on enzymes' concentration.

Lowering of the temperature in step d1) and/or e2) is preferably carried out at a rate between 0.5 to 10° C./min, more preferably 1 to 5° C./min, even more preferably 1 to 3° C./min.

The process according to the present invention comprises preferably a protease activity of between 40 and 220 U/100 L of the liquid portion, more preferably of between 100 and 200 U/100 L of the liquid portion. An enzymatic unit of protease (U) is understood by the skilled person as the necessary quantity to hydrolyze 1 μmol of tyrosine per minute of a soluble casein at pH 7 and 40° C.

The process according to the present invention comprises preferably a deamidase activity of between 1000 and 8000 U/100 L of the liquid portion, more preferably of between 3000 and 6000 U/100 L of the liquid portion. An enzymatic unit (U) of deamidase is understood by the skilled person as the necessary quantity to cause the formation of 1 μmol of $NH_3$ per minute due to 1% casein catalysis.

The process according to the present invention comprises preferably a transglutaminase activity of between 400 and 6500 U/100 L of the liquid portion, more preferably of between 400 to 4000 U/100 L of the liquid portion. An enzymatic unit (U) of transglutaminase is understood by the skilled person as the necessary quantity to cause 1 μmol formation of L-glutamic acid γ-monohydroxamate per minute, due to the catalysis of CBZ-Gln-Gly and hydroxylamine reaction at pH 6 and 37° C.

Steps d1) and/or e2) are preferably performed in a tank with controlled agitation. Moreover, steps d1) and/or e2) might be also adapted to the standard stages of cooling and cold standardization process, modulating enzyme concentrations and incubation times.

The present invention also discloses a liquid food product obtained from the process described hereinabove. Moreover, the present invention also discloses a tea- or coffee-based beverage comprising the liquid food product obtained from the process described hereinabove.

By liquid food product obtained is understood the final liquid food product, that is, the liquid food product obtained by the method herein disclosed.

The liquid food product hereinabove described can be consumed as such, as a final product, but also can be used as a base for preparing other beverages. Specifically, the product obtained after steps f1) and/or f2) is preferably a base for other products, while the product obtained after steps g1) and/or h) can be consumed as a final product.

The present invention also discloses the liquid food product according to the present invention as a food, or a starting material to produce food products, all of them intended for human consumption. In particular, the liquid food product according to the present invention is intended for including people intolerant or allergic to both dairy products and gluten as target consumers.

Therefore, the present invention discloses a process for preparing a liquid food product suitable for human consumers using the liquid food described hereinabove, wherein the liquid food product is the final product or a starting material of the process.

In an embodiment, the human consumers might be celiac or intolerant to gluten (celiac population) and/or might be allergic and/or intolerant to dairy products.

In particular, the present invention discloses the use of the liquid food product according to the present invention as a liquid food product resistant to both aggressive heat treatments (i.e. to temperatures higher than 90° C.) and to acidic beverages, in particular beverages such as coffee and/or tea, that can be consumed hot, meaning at a temperature above room temperature (>25° C.).

The present invention also disclose a process of preparing a tea- or coffee-based beverage that comprises mixing tea or coffee with the liquid food product according to the present invention at a temperature close to their boiling point. Tea or coffee are also prepared at a temperature close to the boiling point of water.

Therefore, the method described in the present invention yields a liquid food product with several advantages with respect to other liquid food products disclosed in the art.

First, the liquid food product obtained by the method described in the present invention is gluten free, that is, the concentration of gluten in oat-derived product disclosed in the invention is lower than 20 ppm (20 mg/kg), in accordance with what is described in Commission Regulation (EC) No 41/2009 concerning the composition and labelling of foodstuffs suitable for people intolerant to gluten (Article 3, section 3) and in the Code of Federal Regulations of the Food and Drug Administration (21CFR101.91).

Secondly, the liquid food product obtained is stable against drastic changes in temperature, i.e. is stable against thermal shocks, and also is stable against drastic changes in the pH without resorting to the use of additives (i.e. acidity regulators and/or stabilizing agents).

Moreover, the protein-enzymatic treatment disclosed in the present invention, i.e., the specific combination of a protease, a deamidase and a transglutaminase, not only does not have a negative impact in flavor and taste but also prevents the generation of aftertaste caused by proteins once they are heat treated, such as bitterness in the liquid food product.

Therefore, the liquid food product according to the present invention is suitable for consumption for all population, and specifically for celiac people and those intolerant or allergic to dairy products, can be heated up to high temperatures (above room temperature, up to 80° C. or event up to the boiling point) and can be consumed as a hot drink and/or mixed with acid-containing beverages such as coffee or tea.

EXAMPLES

The following examples are provided with the intent of further illustrating the present invention but should in no case be interpreted as to be limiting of the present invention. In fact, the two main alternatives (i.e. the implementation of step d) of the process according to the present invention) have been tested in different conditions.

The experiments shown hereinbelow were performed in the Liquats Vegetals S.A. plant, in Viladrau, Spain, during the months of December 2019-August 2021.

Example 1: Oat Base Preparation 5000 kg of peeled oat (Harivenasa S. L., Noáin, Spain) of which its protein content is equal to or less than 14%, was milled for 100 minutes in a dry mill (Skiold® sk5000). The resulting oat flour was mixed with water that was added to the oat flour at a flow rate of 8250 liters per hour in a tank, at a temperature of 48° C. Once water reached a volume of 4800 L, the mixture was heated at a rate of 3° C./min to a target temperature of 75° C. The mixture of oat flour in water was treated in a colloidal mill (MK 2000/10 from IKA®). The glycosidase α-amylase (CYGYC BIOCON S.L., Les Franqueses del Vallès, Spain) was dosed at a flow rate of 26 L/h during 15 minutes into the tank concomitant with the water entrance into the tank to a concentration of 0.05% by weight with respect to the total volume. The glycosidase β-glucanase (CYGYC BIOCON S.L., Les Franqueses del Valles, Spain) was dosed continuously during the oat flour treatment in the tank (90 minutes) at a concentration of 0.02% by weight with respect to the total volume. The resulting pH of the mixture was 6.3.

Example 2: Cooling

The mixture was cooled to 53° C. by means of a system of heat exchange and by re-circulating it in the final storage tank. Cooling rate was 2° C./min.

Example 3: Enzymatic Treatment

The oat-liquid mixture after the cooling step was submitted to a combination of Transglutaminase, Carboxipeptidase and Protein-glutaminase (Biopeptidasa KF®, CYGYC BIOCON S.L., Les Franqueses del Valles, Spain) was dosed in 10 minutes, at a maximum rate, at room temperature. The concentration of the mixture of Transglutaminase, Carboxipeptidase and Protein-Glutaminase (Biopeptidasa KF®) was 0.04% by weight with respect to the total volume of the oat liquid product; this corresponds to 3000 U/100 L, 170 U/100 L and 4200 U/100 L, respectively. Once the dosage of Transglutaminase, Carboxipeptidase and protein-glutaminase was ended, Amyloglycosidase was added in 23 minutes, at room temperature, at a concentration of 0.044% by weight with respect to the total volume of the liquid food product obtained.

The enzymatic treatment was performed at 53° C. and incubation time was 155 minutes.

The enzymatic treatment was minimized by lowering the temperature of the mixture to 2-7° C.

Example 4: Obtention of UHT Liquid Food Product

The liquid part of the enzymatically treated mixture was separated from the precipitating portion by decantation/filtration and further submitted to a UHT treatment under indirect conditions, acquiring a temperature of 141° C. in the holding tube for 3 seconds at a flow rate of 8000 L/h.

Example 5: Study of Effectiveness in Protein Solubilization/Stabilization

To evaluate the protein enzymatic process according to the present invention, 220 mL of UHT oat liquid product was centrifuged at 6000 rpm at room temperature during 15 min to obtain a soluble and a non-soluble fraction. Each of these fractions were lyophilized and quantified in protein content by using the certificated Dumas method. The same process of centrifugation and separation was performed on an UHT oat liquid product that was submitted to an equivalent processing not having the protein enzymatic step aim of the invention.

Table 1 illustrates the protein content of each of the samples in both soluble and insoluble fractions.

| SAMPLE | % protein in soluble fraction | % protein in insoluble fraction |
| --- | --- | --- |
| Control UHT oat product | 7.8 | 52.7 |
| UHT oat product according to the invention | 10.5 | 29.3 |

As shown in Table 1, the product submitted to the process according to the present invention had a higher content of protein in the soluble fraction and less in the insoluble fraction as compared with the control samples (an oat liquid food product not-treated according to the present invention, that is, not submitted to the treatment of a combination of at least a protease, a deamidase and a transglutaminase). Therefore, the protein was more soluble and stable within the matrix of the UHT oat liquid product according to the present invention than in the control UHT oat liquid product.

Example 6: Validation of the Protein Stabilization Treatment

To test the effectivity of the protein-enzymatic treatment to stabilize the proteins in the oat liquid food product, 100 mL of the UHT-processed oat liquid food product was submitted to heating in a Microwave apparatus (MWE 17 IVS Teka) at a maximum potency until boiling (80 seconds), and once the mixture product was heated and stirred to remove water vapor, coffee was added therein. The coffee came from a capsule of Colombian coffee (Hacendado®, Mercadona, Spain) used in a capsule coffee machine (Monodose Philips Senseo®). An UHT oat liquid food product used as sample control. The sample control was obtained following the treatment as disclosed in the present invention but without the addition of the combination of at least a protease, a deamidase and a transglutaminase.

FIGURES A.2, B.2 and C.2 show the oat liquid food product obtained according to the present invention that has been heated and mixed with coffee. As can be observed, the mixture is homogeneous, has good organoleptic properties and, therefore, provides the sensory properties acceptable by final consumers. FIGURE A.2 shows the initial stage of mixing coffee with the liquid food product of the invention, and small aggregates can be seen that completely disappear after 10 seconds (FIGURE B.2). The beverage is stable over time and does not form aggregates (FIGURE C.2)

Conversely, FIGURES A.1, B.1 and C.1 show the control sample (an oat liquid food product obtained with the same processing steps according to the invention without the treatment of a combination of at least a protease, a deamidase and a transglutaminase) that has been heated mixed with coffee. Aggregates are seen after mixing (see FIGURE B.1) and remain stable in time (see FIGURE C.1) and, moreover, perceived in mouth as bitterness. Therefore, the product loses part of the initial organoleptic properties and is less accepted by consumers, not only because of its appearance, but also because of its taste and aftertaste.

The same negative curdling phenomenon was observed in other equivalent UHT oat liquid food products available in the market.

Example 7: Validation of the Absence of Gluten

To test the effectiveness in gluten removal of the protein enzymatic process according to the present invention, the gluten content of UHT oat liquid products was analyzed by using the methodology of ELISA competitive. None of the products analyzed obtained independently in different runs (n=53, average oat protein content of 11.8% w/v) following the process according to the present invention were positive in gluten, meaning that the samples of UHT oat liquid products comprised less than 10 ppm in this allergen, that is, the conditions for gluten-free product as determined by both the European Commission and the FDA (less than 20 ppm) were met.

The invention claimed is:

1. A process for preparing a liquid food product comprising:
   a) a first step comprising obtaining an oat flour by milling peeled oat grain;
   b) a second step comprising mixing the oat flour with water to obtain mixture B;
   c) a third step comprising adding at least one glycosidase to mixture B, and heating mixture B at a rate of 1 to 10° C. per minute to a maximum of 80° C., obtaining a mixture C comprising a liquid portion containing particles in suspension and a precipitating portion; and
   d1) a fourth step comprising lowering the temperature of mixture C to a maximum of 30° C. and adding to mixture C a combination of at least a protease, a deamidase and a transglutaminase to obtain mixture D;
   e1) a fifth step comprising incubating mixture D; and
   f1) a sixth step comprising the separation of the liquid portion and the precipitating portion of mixture D to obtain the liquid food product; and optionally
   g1) a seventh step comprising submitting the liquid portion to a temperature drop of at least 1°C per minute to reach a temperature of a maximum 2°C;
   or
   d2) a fourth step comprising the separation of the liquid portion and the precipitating portion of mixture C;
   e2) a fifth step comprising lowering the temperature of the liquid portion of mixture C to a maximum of 2°C and adding to the liquid portion of mixture C a combination of at least a protease, a deamidase and a transglutaminase to obtain liquid portion D; and
   f2) a sixth step following step e2) comprising incubating the liquid portion D to obtain the liquid food product.

2. The process according to claim 1, further comprising an eighth step h) of microbiological stabilization of the obtained liquid portion.

3. The process according to claim 1, wherein in step b) the oat flour is mixed with at least two glycosydases.

4. The process according to claim 3, wherein the glycosidase is selected from the group consisting of α-amylase and β-glucanase.

5. The process according to claim 1, wherein the oat flour is obtained by dry milling of oat grain or by wet milling of peeled oat grain or a combination of both.

6. The process according to claim 1, wherein a glycosydase, is added together with the combination of at least a protease, a deamidase and a transglutaminase in steps (d1) or (e2).

7. The process according to claim 1, wherein the protease is a carboxypeptidase and/or the deamidase is a proteinglutaminase.

8. The process according to claim 1, wherein mixture B in step c)d) is heated up to a temperature comprised between 55 to 80° C.

9. The process according to claim 1, wherein the concentration of deamidase, protease and transglutaminase in step c) is between 1000-8000 U/100 L of deamidase, between 40-200 U/100 L of protease and between 400-6500 U/100 L of transglutaminase with respect to the total volume of the liquid portion of mixture C.

10. The process according to claim 1, wherein the incubation time in steps e1) or f2) is between 60 minutes and 48 hours.

11. The process according to claim 1, wherein the temperature in step d1) is lowered to a temperature comprised between 30 and 60° C.

12. The process according to claim 11, wherein the temperature in step d1) is lowered to a temperature comprised between 45 and 55° C. and the incubation time in step f1) is between 80 and 160 minutes.

13. The process according to claim 1, wherein the temperature in step e2) is lowered to a temperature between 2 and 8° C.

* * * * *